Patented Sept. 10, 1935

2,014,045

UNITED STATES PATENT OFFICE 2,014,045

SALTS OF BROMINE-SUBSTITUTED UNSATURATED FATTY ACIDS, AND PROCESS OF PREPARING SAME

Siegwart Hermann, Prague, Czechoslovakia

No Drawing. Application April 4, 1931, Serial No. 527,849. In Austria May 10, 1930

4 Claims. (Cl. 260—113)

This invention relates to the preparation of organic bromine derivatives to be used as pharmaceutical products and has for its main object to provide extremely efficacious preparations of this kind.

In order to avoid the undesirable secondary action of the inorganic iodine and bromine compounds used in therapeutics, iodinated and brominated triglycerides have long been employed for therapeutical purposes. These products were prepared in particular from sesame-oil at one time by the addition of iodine monochloride and bromine monochloride, and subsequently, free from chlorine, by additive combination with hydrobromic acid or hydriodic acid. In this connection the incompletely halogenated fats have alone proved stable.

Owing to the low efficiency, and mainly also on account of the rather disagreeable taste, of the iodinated and brominated fats, salts of halogenoted fatty acids were afterwards used. At first, the saturated mono-iodo-aliphatic acids (such as mono-iodo-behenic acid and mono-iodo-stearic acid) were prepared by the action of hydriodic acid, (free from phosphorus), and the corresponding saturated mono-bromo-aliphatic acids by the action of metallic bromides in presence of acids capable of liberating hydrobromic acid from said metallic bromides. Owing to their poor stability and their disagreeable taste the free acids likewise did not prove well adapted for therapeutical use and for this reason it was afterwards proposed to use them in the form of the insoluble neutral salts of the alkaline earths or of magnesia.

The commercial product "saiodine" is the calcium salt of mono-iodo-behenic acid; and "sabromine" is calcium-dibromo-behenate. In preparing these salts the dibromo-behenic acid obtained from erucic acid by the additive introduction of 2 atoms of bromine is converted into the corresponding salt by reacting the alkali salts of dibromo-behenic acid with calcium, magnesium or strontium salts, or by direct saturation of the acid with calcium or magnesium or strontium compounds.

Tri-iodinated derivatives of stearic acid have been obtained by the additive introduction of three molecules of iodine mono-bromide, iodine mono-chloride or hydriodic acid on to the three double linkages of linoleic acid. Instead of starting from pure linoleic acid for said purpose, the mixture of linseed-oil fatty acids, obtained by the saponification of linseed-oil, has also been used as starting material. For instance tri-iodo-stearic acid and tri-iodo-tri-bromo stearic acid or tri-iodo-tri-chloro-stearic acid have been prepared in this manner. These compounds were intended to be used in therapeutics in the form of free acids, and as salts, e. g. calcium salts.

In all these processes, unsaturated aliphatic acids of high molecular weight, have been transformed into halides of saturated aliphatic acids by additive combination with halogen acids, iodine-mono-chloride, iodine-mono-bromide, or elementary bromine. According to the present invention, in contradistinction thereto the bromine-addition products obtained by the addition of elementary bromine to unsaturated aliphatic acids of high molecular weight are converted by partially splitting off hydrobromic acid, for instance by treatment with alcoholic caustic potash into bromine-substitution products of unsaturated aliphatic acids, which acids are then transformed into their alkali, ammonium or alkaline-earth salts, in order to recover the salts in a solid state, from the solution by usual methods. In this process also, it has been found advantageous to use, as the originating material, natural fatty-acid mixtures, such as are obtained by the saponification of natural fatty substances (e. g. olive oil, rape oil, ground-nut oil, sesame oil, cotton seed oil, linseed oil, poppy oil, castor oil or fish oils). Instead of the free acids, the tri-glycerides also may be brominated, whereupon the saponification and the partial splitting off of hydrobromic acid may be effected simultaneously, for instance by treatment with alcoholic caustic potash.

If one gram-molecule of hydrobromic acid be split off from dibromo-stearic acid, by treatment with alcoholic caustic potash this reaction leads, when oleic acid is employed to a mono-bromo-oleic acid ($C_{18}H_{33}BrO_2$). If instead of oleic acid, as the raw material, olive oil, which contains oleic acid as well as linoleic acid ($C_{18}H_{32}O_2$),—be used, there is obtained, in addition to a mono-bromo-oleic acid, a dibromo-linoleic acid ($C_{18}H_{30}Br_2O_2$) which is formed by the addition of 4 Br. and the splitting off of two molecules of hydrobromic acid. The bromine derivative obtained when erucic acid is taken, is mono-bromo-erucic acid. Therefore, in this case also, a bromine-substitution product of the unsaturated erucic acid is formed; whereas the "sabromine" is the calcium salt of the saturated dibromo-behenic acid obtained by the addition of bromine to erucic acid.

The process yields extremely efficacious organic bromine compounds or mixtures of such compounds. The lethal doses of the most active preparations is 0.1 gram of bromine per 1 kilogram of the body-weight of rabbits, while the lethal doses of sodium bromide for rabbits is 2.37 grams per 1 kilogram of body weight.

From "sabromine," containing 29.5% of bromine, there have been obtained, by splitting off hydrobromic acid by the action of alcoholic caustic potash, a sodium salt with 15.4% of bromine and a calcium salt with 11.1% of bromine. Both these salts had a fatal effect on rabbits when dispensed in a dose of 0.3 gram of bromine per 1 kilogram of body weight. On the other hand the "sabromine" used as originating material did not produce any effect with a dose of 1 gram of bromine per 1 kilogram of the rabbit's weight. As results from prior tests the lethal doses of the sabromine is 2.1 grams of bromine for 1 kilogram of animal weight. As regards medicinal application, the considerably increased efficacy affords, primarily, the extremely valuable possibility of producing the same effects as bromine but with extremely reduced doses.

*Examples*

1. 240 grams of olive oil are treated with 280 cubic centimeters of 20% alcoholic caustic potash, and boiled for about half of an hour in an apparatus provided with a reflux condenser. After the alcohol has been distilled off, the fatty acids are set free by the action of sulphuric acid, and are then washed and dried. In this manner 160 grams of a mixture of fatty acids are obtained, which is then brominated with 100 grams (that is, the approximately theoretical amount) of bromine. To 150 grams of the brominated acids 300 cubic centimeters of 20% alcoholic caustic potash are added and the mixture is then heated for half an hour in an apparatus provided with a reflux condenser. After evaporating the alcohol, the acids are liberated by the addition of sulphuric acid, washed, and converted, by the addition of caustic soda solution, into the sodium salts, which finally are salted out from the solution, by means of sodium bromide, separated by filtration, dried in vacuo, boiled with acetone and again dried in vacuo. The whole operation is preferably carried out in an atmosphere of nitrogen, thereby protecting the reaction mass from the contact with air.

2. Bromine is poured slowly into 100 grams of well cooled olive oil until the oil temperature ceases to rise and until the air above the reaction mass becomes tinged with brown. The oil will take up about 60 grams of bromine. Next, 320 cubic centimeters of 20% absolute alcoholic caustic potash are slowly added, boiling during this addition being, if necessary, prevented by cooling. The contents of the flask are heated for half of an hour in a water bath provided with a reflux condenser, the brominated fat being thereby saponified, and part of the bromine being split off as hydrobromic acid. After evaporation sulphuric acid is run in until the mixture shows an acid reaction. After a short heating, the glycerine water is syphoned off. The brominated acids are washed, treated with caustic soda and heated until the solution is clear, and light yellow in color. In order to salt out the sodium salt, sodium bromide is added until the gelatinous mass has become thinly fluid and the precipitate forms. After protracted standing, the precipitate is separated by filtration, and the salt is dried in vacuo on the water bath. It is then boiled with acetone, filtered off, and the acetone is expelled in vacuo on the water bath. In this case also it is preferred to carry out the entire operations from the beginning to the end with exclusion of the air, for instance in an atmosphere of nitrogen.

The sodium salts of the olive-oil fatty acids obtained by the operations as set forth in the Examples 1 and 2 contain 12% to 18% of bromine. The yield when starting from the oil itself is about 80% and when starting with the free fatty acids recovered from olive oil it rises to 90% or more. The lethal dose is from 0.1 to 0.2 gram of bromine per 1 kilogram of rabbit body weight. With pure commercial oleic acid as raw material, 100% of a sodium salt are obtained, the bromine content of which varies between 15% and 26%. The lethal dose is about 0.2 gram of bromine.

3. In the same manner as set forth in Examples 1 and 2, sodium salts also may be prepared from ground-nut oil, (bromine content 20%, yield 95%, lethal dose 0.1 to 0.2 gram of bromine); from linseed oil (bromine content 17.4%, yield 20%, lethal dose 0.2 gram of bromine), from poppy oil (bromine content 19.2%, yield 30%, lethal dose 0.25 gram of bromine), from rape oil (bromine content 24.1%, yield 96%, lethal dose 0.3 gram of bromine). Cod-liver oil gives a sodium salt with a yield of about 80%, the bromine content being about 7.3% and the lethal dose 0.2 gram.

4. For preparing salts of the alkaline earths a dilute solution of an alkaline earth salt, (for instance, chloride), is added to an aqueous solution of the sodium salts. After boiling for a quarter of an hour the solution is allowed to cool down in an atmosphere of nitrogen. The precipitated salt is separated by pressure and washed with cold water until the chlorine reaction has disappeared. When free bromo-fatty acids are employed, they may be exactly neutralized by means of very dilute alkali, the further operations being then carried out in the same manner as already described.

It is known to convert unsaturated acids with a double linkage into acids which, instead of the original double linkage, contain a triple linkage or two double linkages by the addition of two atoms of bromine and subsequently treating the resulting dibromide with alcoholic caustic potash until the two bromine atoms are completely split off in the form of hydrobromic acid. Thus stearolic acid ($C_{18}H_{32}O_2$), an acid of the propiolic acid series) has been produced by treating dibromo-stearic acid ($C_{18}H_{34}Br_2O_2$), obtained by the addition of 2 atoms of bromine to oleic acid, with alcoholic potash lye.

From erucic acid ($C_{22}H_{42}O_2$) behenolic acid ($C_{22}H_{40}O_2$) is prepared in the same way. Moreover it is known, for the purpose of producing unsaturated fatty acids of the series $C_nH_{2n-4}O_2$ by this method to employ as raw materials, the natural oils containing the glycerides of the corresponding fatty acids of the oleic acid series.

Moreover, a mono-bromo-oleic acid, of the approximate composition $C_{18}H_{33}BrO_2$, has already been produced by the action of alcoholic caustic potash solution on the dibromide of a stearic acid which has been prepared by brominating an oleic acid recovered from the ether-soluble portion of the lead salts of the fatty acid mixture contained in natural almond oil. ("Annalen" vol. 140 1866 pages 42 and 47). Consequently, the method for preparing the bromine-substituted unsaturated fatty acids by splitting off hydrobromic acid from saturated bromine-addition products which method is preferably employed in the herein described process, has also already been described for the production of a mono-bromo-substitution product of oleic acid. However, salts of monobromo oleic acid have not been produced, nor has the high therapeutic value of such compounds been known at all. On the contrary the numerous experiments undertaken since this earlier practice, have, as already shown, been delivered and limited to the preparation of halides of saturated fatty acids.

Eckert (Monatshefte für Chemie, vol. 38 1917 pages 9 and 10) has also obtained a mono-bromo-oleic acid and converted the oily acid, for the purpose of purification, via the lead salt into a crystalline lithium salt. For this purpose the 2,3-dibromostearic acid has been prepared by synthesis from the 2,3-oleic acid and this acid has been converted into the 2-bromo-3,4-oleic acid, by treatment with alcoholic caustic potash. It has been stated by applicant as the result of experiments that neither this free acid nor its sodium salt is of any therapeutic value. Whether the 2,3-oleic acid be present in the natural fatty acid mixture of the olive oil or not is immaterial; the mixture contains in any case, as is well known, mainly 9,10-oleic acid which by the addition of bromine yields 9,10-dibromostearic acid, and the latter is converted into the new highly active bromine-substituted oleic acid by splitting off hydrobromic acid.

What I claim is:

1. A process for the preparation of organic bromine derivatives which consists in brominating natural fatty substances which contain in chemical combination unsaturated high-molecular fatty acids, converting the so obtained bromine-addition products by saponification and splitting off hydrobromic acid into bromine-substitution products of unsaturated fatty acids, transforming the said acids into salts of the class consisting of alkali metal, ammonium-, calcium-, and strontium salts, and isolating the solid salts.

2. A process for the preparation of organic bromine derivatives which consists in brominating natural fatty substances which contain in chemical combination unsaturated high-molecular fatty acids, up to saturation, converting the thus obtained bromine-addition products by treatment with alcoholic caustic potash into bromine-substitution products of unsaturated fatty acids, transforming the said acids into salts of the class consisting of alkali metal, ammonium-, calcium-, and strontium salts, and isolating the solid salts.

3. A process for the preparation of organic bromine derivatives which consists in brominating natural olive-oil so as to obtain bromine-addition products of the unsaturated acids occurring therein, converting the said bromine-addition products by saponification and splitting off hydrobromic acid into bromine-substituted unsaturated fatty acids, transforming the said acids into salts of the class consisting of alkali metal, amminium-, calcium-, and strontium salts, and isolating the solid salts.

4. Organic bromine derivatives produced by brominating natural olive oil so as to obtain bromine-addition products of the unsaturated acids occurring therein, converting the said bromine-addition products by saponification and splitting off hydrobromic acid into bromine-substituted unsaturated fatty acids, and transforming the said acids into solid salts of the class consisting of alkali metal, ammonium-, calcium-, and strontium salts.

SIEGWART HERMANN.